US012566592B2

(12) United States Patent
Borra et al.

(10) Patent No.: US 12,566,592 B2
(45) Date of Patent: Mar. 3, 2026

(54) IDENTIFYING METHOD FOOTPRINTS USING VECTOR EMBEDDINGS

(71) Applicant: Salesforce, Inc., San Francisco, CA (US)

(72) Inventors: Ajay Krishna Borra, San Francisco, CA (US); Manpreet Singh, London (GB); Ravi Sankar Pulle, San Francisco, CA (US); Amrita Saha, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 190 days.

(21) Appl. No.: 18/065,901

(22) Filed: Dec. 14, 2022

(65) Prior Publication Data

US 2024/0201958 A1 Jun. 20, 2024

(51) Int. Cl.
*G06F 8/35* (2018.01)
*G06F 9/50* (2006.01)

(52) U.S. Cl.
CPC .............. *G06F 8/35* (2013.01); *G06F 9/5055* (2013.01)

(58) Field of Classification Search
CPC ............. G06F 9/50; G06F 9/5055; G06F 8/35
See application file for complete search history.

(56) References Cited

U.S. PATENT DOCUMENTS

2019/0213099 A1* 7/2019 Schmidt ................. G06N 3/044
2022/0179763 A1* 6/2022 Chan ................... G06F 11/3006

OTHER PUBLICATIONS

Ara, Gabriele et al. "Simulating execution time and power consumption of real-time tasks on embedded platforms." Proceedings of the 37th ACM/SIGAPP Symposium on Applied Computing. 2022. Retrieved from the Internet<https://dl.acm.org/doi/pdf/10. 1145/3477314.3507030> (Year: 2022).*
Min-Allah, Nasro, et al. "Cost efficient resource allocation for real-time tasks in embedded systems." Sustainable Cities and Society 48 (2019): 101523. Retrieved from the Inetrnet<https://www. sciencedirect.com/science/article/pii/S2210670718300635> (Year: 2019).*

* cited by examiner

*Primary Examiner* — S. Sough
*Assistant Examiner* — Cheneca Smith
(74) *Attorney, Agent, or Firm* — Holland & Hart, LLP

(57) ABSTRACT

Methods, systems, apparatuses, devices, and computer program products are described. A system may collect a first set of profiling data associated with computational resource consumption of one or more code implementations or methods. The system may use a vector embedding translation to convert the profiling data into one or more vector spaces. Each vector space may include a set of vectors, and each vector may correspond to an execution of a code implementation or method. The system may use the vector spaces to generate a model representation of the computational resource consumption of the one or more code implementations. In some cases, the system may collect and convert a second set of real-time profiling data into vector spaces, which the system may compare to the model representation such that users may identify deviations from resource consumption footprints.

17 Claims, 9 Drawing Sheets

110-a 130-a 110-b 130-b 105-a 105-b 105-c

Data Center

120

140

Cloud Platform

115

125

135

130-c 110-c 130-d 110-d

100

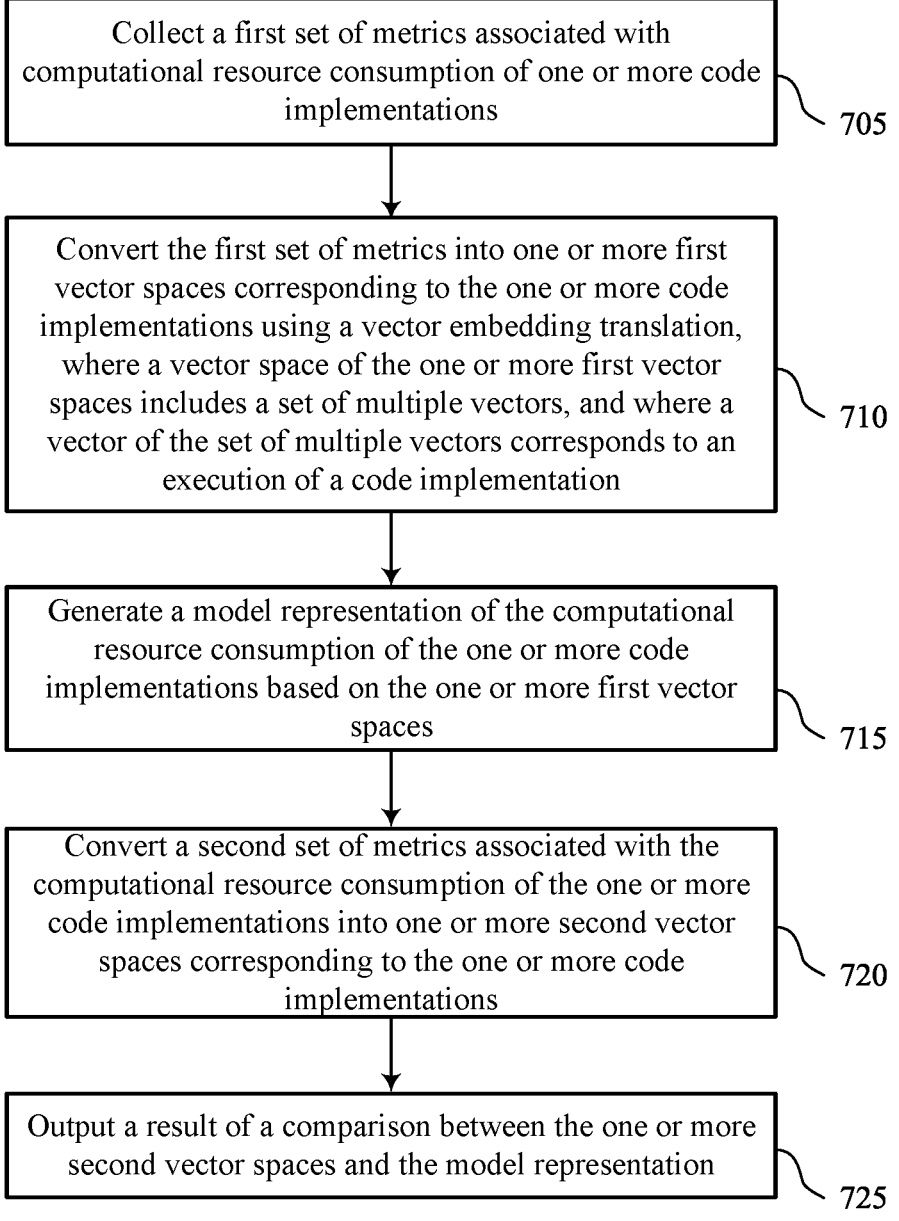

Collect a first set of metrics associated with computational resource consumption of one or more code implementations

705

Convert the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation

710

Generate a model representation of the computational resource consumption of the one or more code implementations based on the one or more first vector spaces

715

Convert a second set of metrics associated with the computational resource consumption of the one or more code implementations into one or more second vector spaces corresponding to the one or more code implementations

720

Output a result of a comparison between the one or more second vector spaces and the model representation

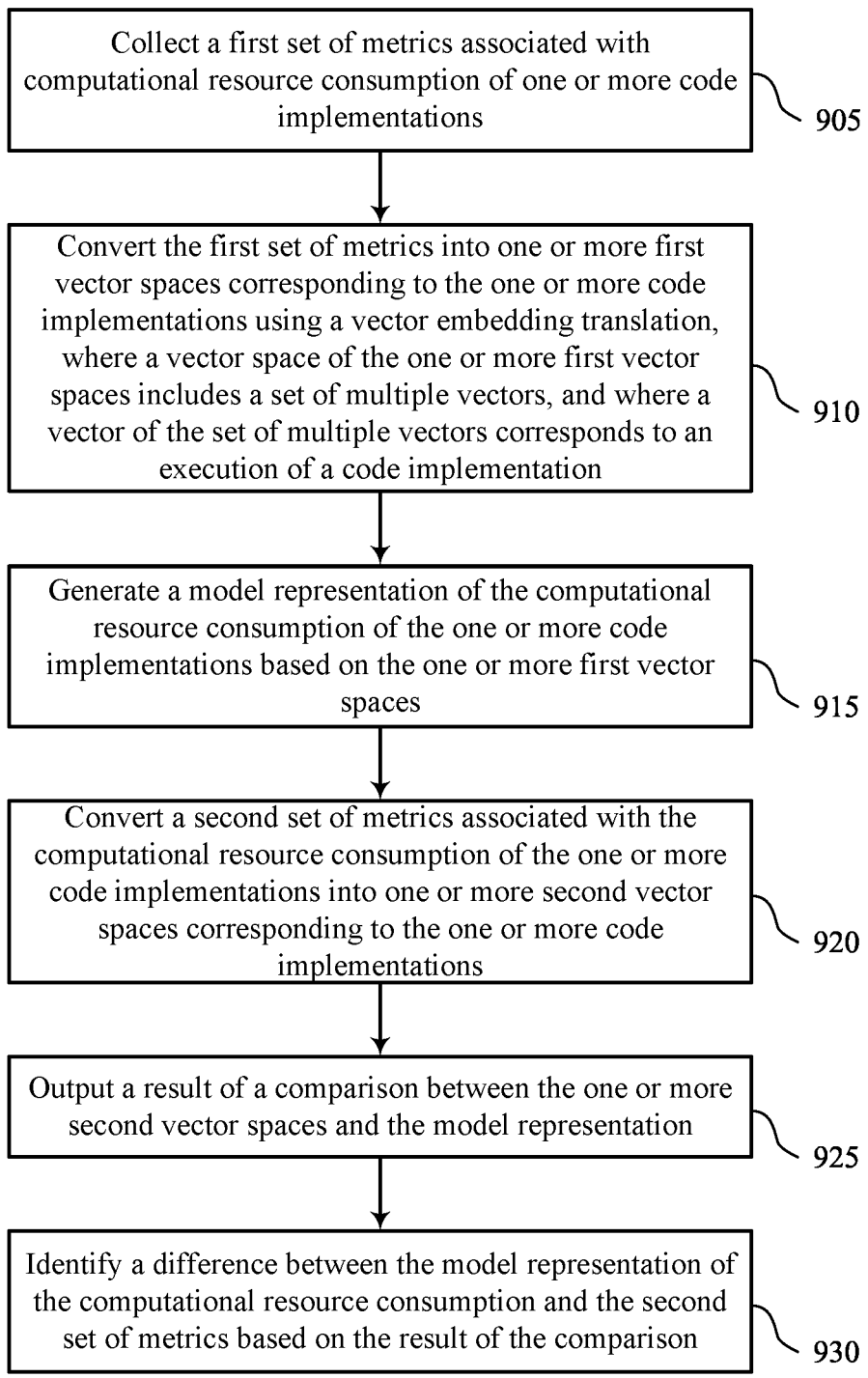

Collect a first set of metrics associated with computational resource consumption of one or more code implementations — 905

Convert the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation — 910

Generate a model representation of the computational resource consumption of the one or more code implementations based on the one or more first vector spaces — 915

Convert a second set of metrics associated with the computational resource consumption of the one or more code implementations into one or more second vector spaces corresponding to the one or more code implementations — 920

Output a result of a comparison between the one or more second vector spaces and the model representation — 925

Identify a difference between the model representation of the computational resource consumption and the second set of metrics based on the result of the comparison — 930

IDENTIFYING METHOD FOOTPRINTS USING VECTOR EMBEDDINGS

FIELD OF TECHNOLOGY

The present disclosure relates generally to database systems and data processing, and more specifically to identifying method footprints using vector embeddings.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support applications that include large quantities of code execution paths. If code implementation is poor for any one or more code execution paths in a production environment, the cloud platform may experience high resource consumption. As such, in a multi-tenant or shared-resource environment, code implementation of one entity may affect multiple other entities. Moreover, the cloud platform may enable custom code (e.g., developed by a customer) to be run, which may result in a poor user experience as the code implementation quality may be lower than coding standards associated with the cloud platform. Such code execution paths may result in high resource consumption or other performance issues, as well as poor user experience.

BRIEF DESCRIPTION OF THE DRAWINGS

FIGS. 7 through 9 illustrate flowcharts showing methods that support identifying method footprints using vector embeddings in accordance with aspects of the present disclosure.

DETAILED DESCRIPTION

Figure 1:
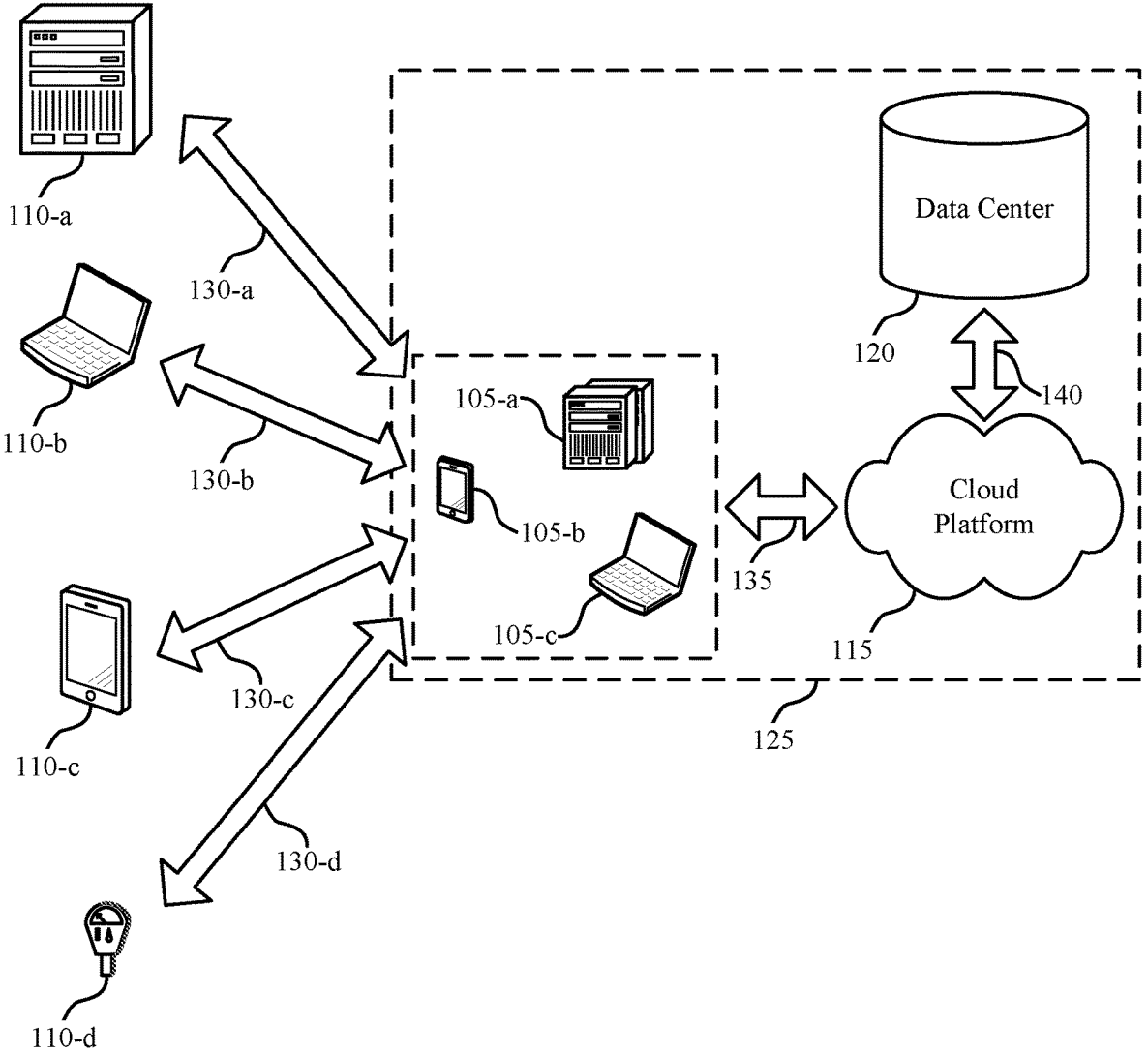
FIG. 1 illustrates an example of a data processing system that supports identifying method footprints using vector embeddings in accordance with aspects of the present disclosure.

A cloud platform may support complex applications that include large quantities of code execution paths, where a code execution path may include a sequence of method calls. In some examples, a code execution path may include code implemented by a customer of the cloud platform, where such code implementation may differ from that of other code associated with the applications. As inputs to the methods may vary, resource consumption or resource usage footprints associated with the methods may vary. To identify the resource consumption footprints of the methods and determine which methods or functions are consuming excessive resources, a system may generate an embedded vector space representation model of computational resource consumption of a code implementation. That is, the system may generate an average or other baseline resource consumption of a given method such that users may identify deviations from that average.

Techniques described herein support leveraging vector embeddings and machine learning to identify and report resource consumption footprints of code methods in code execution paths. A system may collect profiling data to extract the methods in code execution paths of applications and their associated computational resource consumption (e.g., resource usage) data. The computational resource consumption data may include central processing unit (CPU) consumption data, memory consumption data, network consumption data, and the like. As inputs to the methods may vary, the computational resource consumption footprints for these methods may vary. As such, the system may use the profiling data to learn an embedded vector space representation model, which includes a baseline or typical computational resource consumption footprint of the methods. When the embedded vector space representation model is built, the system may use the model to identify methods that deviate too far from their known or typical resource footprints and report the deviations back to users such that they may improve the methods accordingly.

Identifying method footprints using vector embeddings, as described herein, may support improved user experience, reduced resource consumption, and improved system performance, among other benefits. For example, the techniques described herein support generating a model representation of computational resource consumption of code implementations such that a user may identify a baseline (e.g., average) resource consumption of a given method and improve method code accordingly, which may result in reduced resource consumption. Additionally, by improving the method code based on resource consumption footprints, the described techniques may support improved user experience and improved system performance as the method code may have improved functionality.

Aspects of the disclosure are initially described in the context of an environment supporting an on-demand database service. Aspects of the disclosure are then described in the context of computing architectures and process flows. Aspects of the disclosure are further illustrated by and described with reference to apparatus diagrams, system diagrams, and flowcharts that relate to identifying method footprints using vector embeddings.

FIG. 1 illustrates an example of a system 100 for cloud computing that supports identifying method footprints using vector embeddings in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

One or both of the cloud platform 115 or the subsystem 125 may support complex applications of a multi-tenant system (e.g., including cloud clients 105), such as marketing or other CRM platforms, that include large quantities of code execution paths. One or more of the code execution paths may run frequently in a production environment, which may impact multiple tenants of the multi-tenant system. That is, a code implementation associated with one entity and running inefficiently may impact all other entities of the multi-tenant system. In some cases, the cloud platform 115 may support a system (e.g., a profiler), which may leverage vector embedding and machine learning to identify and report resource footprints of code methods (e.g., Java and apex methods) in code execution paths associated with the applications. In this way, a user may identify code execution paths running inefficiently such that they may update corresponding code and improve user experience for the multi-tenant system.

In some examples, many of the code execution paths may frequently run in production environments. As such, poor code implementation in the methods involved in these code execution paths may result in high resource consumption on the cloud platform 115. This issue may compound if the cloud platform 115 enables customer-developed code (e.g., customer Apex code) to run, as the implementation quality of such code may be relatively lower compared to coding standards of the cloud platform 115. Running code developed and implemented by different users in this way may use excessive resources and result in a poor customer experience (e.g., if code runs slow in a production environment). However, the cloud platform 115 may lack techniques to programmatically identify code execution paths that may likely result in high resource consumption or other performance issues.

To improve resource consumption, user experience, and performance associated with different code execution paths, the data processing system 100 may support techniques for leveraging vector embedding and machine learning to identify and report resource footprints of code implementations (e.g., code methods in code execution paths). For example, the data processing system 100 may support techniques for identifying and reporting poor code implementations (in terms of resource consumption) to users to provide the users an opportunity to improve associated code before peak usage time (e.g., provides users an ability to detect problematic customer methods ahead of time). A system may collect a first set of metrics or profiling data associated with computational resource consumption of one or more code implementations. The system may convert the first set of metrics into a set of vector spaces using a vector embedding translation, where a vector space may include a set of multiple vectors, and where a vector may correspond to an execution of a code implementation.

In some examples, the system may generate a model representation of the computational resource consumption of the code implementations based on the set of vector spaces. For example, the model representation may indicate an average, maximum, minimum, or other baseline computational resource consumption of the code implementations for comparison with live resource consumption data. The system may collect and convert a second set of metrics or profiling data (e.g., including the live resource consumption data) to a second set of vector spaces and output a result of a comparison between the second set of vector spaces and the model representation. Using the comparison, a user may identify if the computational resource consumption of a code implementation deviates or varies too much from the model representation and make appropriate changes to code to improve the resource consumption.

In a non-limiting example, the cloud platform 115 may support applications and code implementations associated with filing taxes. During particular months of the year, the applications may experience increased user traffic, resulting in some functions (e.g., code methods) being called very frequently. If any one of these functions is inefficient or uses excessive resources, an application may experience slowdowns or other performance issues, which may negatively affect customer experience. The cloud platform 115 may utilize the techniques described herein to identify and reduce a quantity of expensive function calls in a given code execution path to increase efficiency, reduce computational resource consumption, and improve the speed of the applications and subsequently, customer experience.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
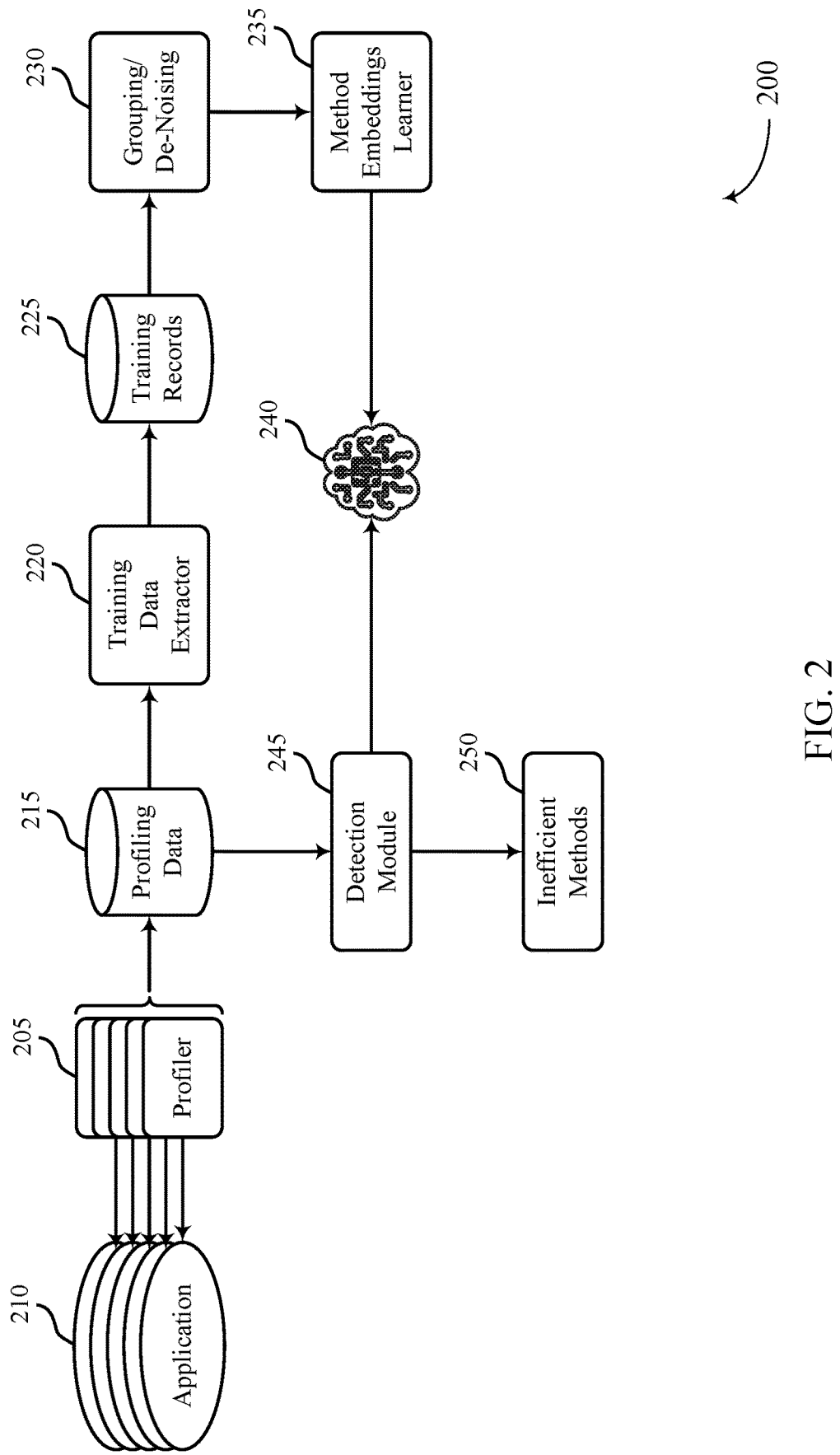
FIG. 2 illustrates an example of a computing architecture that supports identifying method footprints using vector embeddings in accordance with aspects of the present disclosure.

FIG. 2 illustrates an example of a computing architecture 200 that supports identifying method footprints using vector embeddings in accordance with aspects of the present disclosure. The computing architecture 200 may implement or be implemented by aspects of the data processing system 100. For example, the computing architecture 200 (which may be an example of a system or a data processing system described herein) may include a profiler 205, an application 210, and profiling data 215. In addition, the computing architecture 200 may include a training data extractor 220, training records 225, a grouping/de-noising function 230, and a method embeddings learner 235, which may be used to train and generate a machine learning model 240. Additionally, the computing architecture 200 may include a detection module 245 which may be used to identify inefficient methods 250. Each of the components described herein may be implemented by aspects of a cloud platform 115 or a subsystem 125 described with reference to FIG. 1. In some examples, the systems or servers supporting each of the components may be logically or physically separated from each other.

As described herein, the computing architecture 200 may support techniques for leveraging vector embedding and machine learning to identify and report computational resource consumption footprints of code methods (e.g., Java and Apex methods) in code execution paths. One or more applications 210 may support multiple code execution paths, where a code execution path may include a sequence of method calls. In some examples, the profiler 205 may collect the profiling data 215 from the one or more applications 210 to extract methods in the code execution paths and their associated computational resource consumption data (e.g., how much a function uses of a particular resource). That is, the profiler 205 may collect a first set of profiling data (e.g., metrics) associated with computational resource consumption of one or more code execution paths (e.g., code implementations) of one or more applications 210. The profiling data 215 may be stored in a database or some other data store. In some cases, the computational resource consumption may include CPU consumption, memory consumption, network consumption, or a combination thereof.

As the inputs to the method calls may vary, the computational resource consumption or computational resource usage footprint of the method calls may vary. Accordingly, the computing architecture 200 may utilize a mechanism to identify any significant deviations in the computational resource consumption of a given method or code execution path (e.g., code implementation) from a corresponding computational resource footprint.

The profiler 205 may use the profiling data 215 to learn an embedded vector space representation model, which may include the computational resource consumption footprints of one or more methods or code execution paths. In some examples, during a training phase, the profiler 205 may use the collected profiling data 215 as training data for a machine learning model 240 (which may generate the embedded vector space representation model). For example, the training data extractor 220 may extract the profiling data 215 from its storage location and enable it for use as training data for the machine learning model 240, where the training data may be stored as training records 225 (e.g., in a database).

In some examples, the training data may be pre-processed (e.g., grouped, de-noised, etc.) using the grouping/de-nois- ing function 230, and sent to the method embeddings learner 235, which may apply a vector embedding translation to the training data. The machine learning model 240 may use the training data and the method embeddings learner 235 to learn custom vector embeddings tuples for each method. That is, the profiler 205 may use numerous components or functions to convert the first set of profiling data (e.g., metrics) into one or more first vector spaces corresponding to the one or more code implementations using a vector embedding translation. In this way, the machine learning model 240 may learn and represent each method of a code execution path as a vector (e.g., of n dimensions) in a compact form, where the computational resource consumption footprints are associated with the corresponding vector embedding. Such a vector representation may provide for lightweight models, such that it may be practical to run detection processes in real time. The machine learning model may then use the one or more first vector spaces to generate the embedded vector space representation model of the methods (e.g., a model representation of the computa- tional resource consumption of the one or more code imple- mentations).

As described herein, each code implementation or method may be represented as an n-dimensional vector space indi- cating a computational resource consumption footprint of the code implementation or method. In this way, a vector space of the one or more first vector spaces may include a set of multiple vectors, where a vector of the set of multiple vectors may correspond to an execution of a code imple- mentation. In some examples, a vector corresponding to an execution of a code implementation may include a set of values representing a given computational resource con- sumption, the values generated based on the first set of profiling data. For example, a vector may be represented as $$\left\langle \begin{Bmatrix} a_1 \\ a_2 \\ \vdots \\ a_n \end{Bmatrix}, r_1, r_2, \dots, r_n \right\rangle,$$

where the column vector $\vec{a}$ may represent a method and the row vector $\vec{r}$ may represent the set of values of computa- tional resource consumption of the method (e.g., the values may correspond to CPU, memory, and network consump- tion). Moreover, the vector representing the method may include a floating point vector, such that the vector may include reference to any metrics and metadata associated with a large quantity of methods. Using a vector embedding translation in this way, computational resource consumption data may be mapped to a code implementation or a method and assigned a vector identifier. That is, the method embed- dings learner 235 may generate a set of multiple vector identifiers for the set of multiple vectors, where a vector identifier corresponds to the set of values representing the computational resource consumption.

Using the model representation, a user may observe a summary or current trends of performance data (e.g., the computational resource consumption data) of a method, and identify methods or functions consuming excessive amounts of data. To do this, the profiler 205 may collect a second set of metrics associated with the computational resource con- sumption of the one or more code implementations and convert it into one or more second vector spaces correspond- ing to the one or more code implementations. The second set of metrics may include real-time (e.g., live) CPU consump- tion, memory consumption, network consumption, or a combination thereof. In some examples, the profiler 205 may store the second set of profiling data with the profiling data 215 (e.g., in an database), and may pass the second set of profiling data as the second set of vector spaces to the detection module 245. Additionally, the machine learning model 240 may output the embedding vector space repre- sentation model to the detection module 245.

The detection module 245 may compare the second set of vector spaces to the embedding vector space representation model to detect deviations in the computational resource consumption of a code implementation or a method from the average or baseline resource consumption footprint. In some cases, the detection module 245 may detect one or more high resource-consuming functions based on their profiling data deviating far from the model representation. In some examples, the detection module 245 may output a result of a comparison between the second vector spaces and the model representation, the output indicating the inefficient methods 250 identified based on their deviations from the model representation. For example, the detection module 245 may identify a difference between the model represen- tation and the second set of profiling data based on the output result.

For example, the behavior of a relatively simple function, such as a copy function, may change based on the size or amount of data it is processing. That is, different inputs may trigger different pieces of code within a function, which may alter performance characteristics of that function. In some examples, in addition to computational resource consumption data, the profiling data 215 (e.g., the first set of metrics on which the machine learning model 240 is trained) may include metadata (e.g., data size) that indicates different behaviors of the function. As described herein, the method embeddings learner 235 may convert the profiling data 215 to vector spaces (e.g., where a vector r may represent values corresponding to CPU, memory, and network consumption). From these vectors, the machine learning model 240 may learn general usage of resources for a particular function. In the example of the copy function, it may take 5 seconds to copy a 1 MB input and 20 minutes to copy a 1 TB input. That is, the behavior of the copy function may vary based on data size, as indicated in the corresponding metadata. As the model representation may be built on this general resource usage data, a user may compare real-time functionality of the copy function to the model representation and evaluate whether the function is taking longer than it should and consuming excessive resources. Moreover, the techniques described herein may enable a user to identify specific blocks of code of a function that is problematic, such that the user may improve the code on a granular level. For example, the user may rank code blocks in terms of computational resource consumption and quickly identify problematic code based on the ranking.

Figure 3:
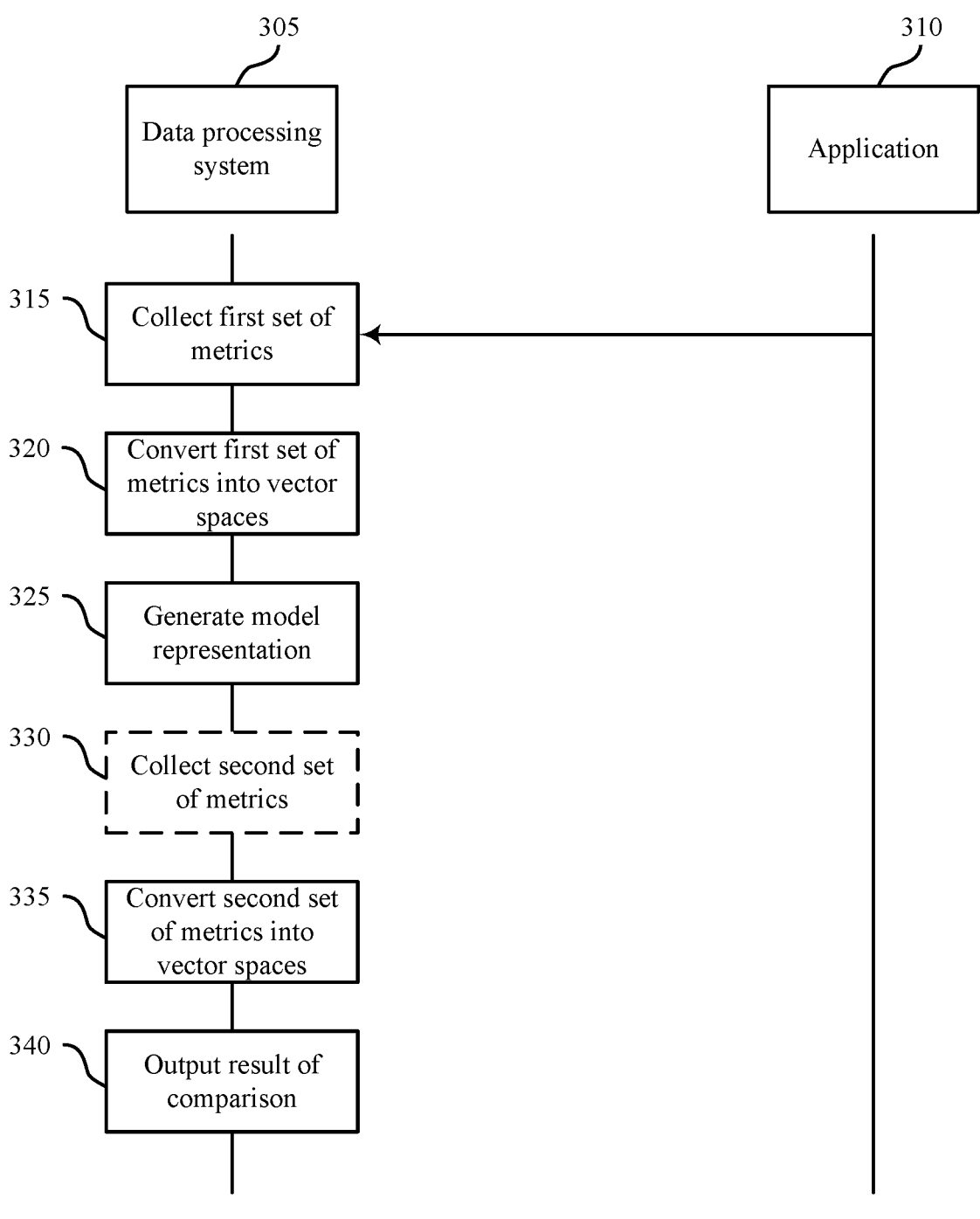
FIG. 3 illustrates an example of a process flow that supports identifying method footprints using vector embeddings in accordance with aspects of the present disclosure.

FIG. 3 illustrates an example of a process flow 300 that supports identifying method footprints using vector embeddings in accordance with aspects of the present disclosure. The process flow 300 may implement or be implemented by aspects of the data processing system 100 or the computing architecture 200. For example, the process flow 300 may include a data processing system 305 (e.g., a profiler) and an application 310, which may be examples of corresponding services and platforms described with reference to FIGS. 1 and 2. In the following description of the process flow 300, operations between the data processing system 305 and the application 310 may be performed in a different order or at a different time than as shown. Additionally or alternatively, some operations may be omitted from the process flow 300, and other operations may be added to the process flow 300. The process flow 300 may support techniques for reducing computational resource consumption and improving user experience, among other benefits.

At 315, the data processing system 305 may collect, from the application 310, a first set of metrics associated with computational resource consumption of one or more code implementations. The first set of metrics may be referred to as a first set of profiling data, which may indicate CPU usage, memory usage, network usage, or other types of computational resource usage of a given method or function call of a code implementation.

At 320, the data processing system 305 may convert the first set of metrics into one or more first vector spaces corresponding to the one or more code implementations using a vector embedding translation, where a vector space of the one or more first vector spaces may include a set of multiple vectors, and where a vector of the set of multiple vectors may correspond to an execution of a code implementation. That is, the data processing system 305 may associate computational resource consumption data with a method using a vector representation, such that large amounts of computational resource consumption data may be stored.

At 325, the data processing system 305 may generate a model representation of the computational resource consumption of the one or more code implementations based on the one or more first vector spaces. As such, the data processing system 305 may use the profiling data to train a machine learning model to learn an embedded vector space representation model, which indicates computational resource footprints (e.g., indicating an average or other baseline computational resource consumption) of a method of the code implementation.

At 330, the data processing system 305 may collect, from the application 310, a second set of metrics associated with computational resource consumption of one or more code implementations. The second set of metrics may include live or real-time computational resource consumption data.

At 335, the data processing system 305 may convert the second set of metrics associated with the computational resource consumption of the one or more code implementations into one or more second vector spaces corresponding to the one or more code implementations. As for the first set of vector spaces, a vector space of the one or more second vector spaces may include a set of multiple vectors, and a vector of the set of multiple vectors may correspond to an execution of a code implementation.

At 340, the data processing system 305 may output a result of a comparison between the one or more second vector spaces and the model representation. In some examples, a user may use the output result to identify code implementations and methods that deviate from an average or other computational resource consumption footprint and modify code accordingly to reduce the resource consumption and improve code efficiencies.

Figure 4:
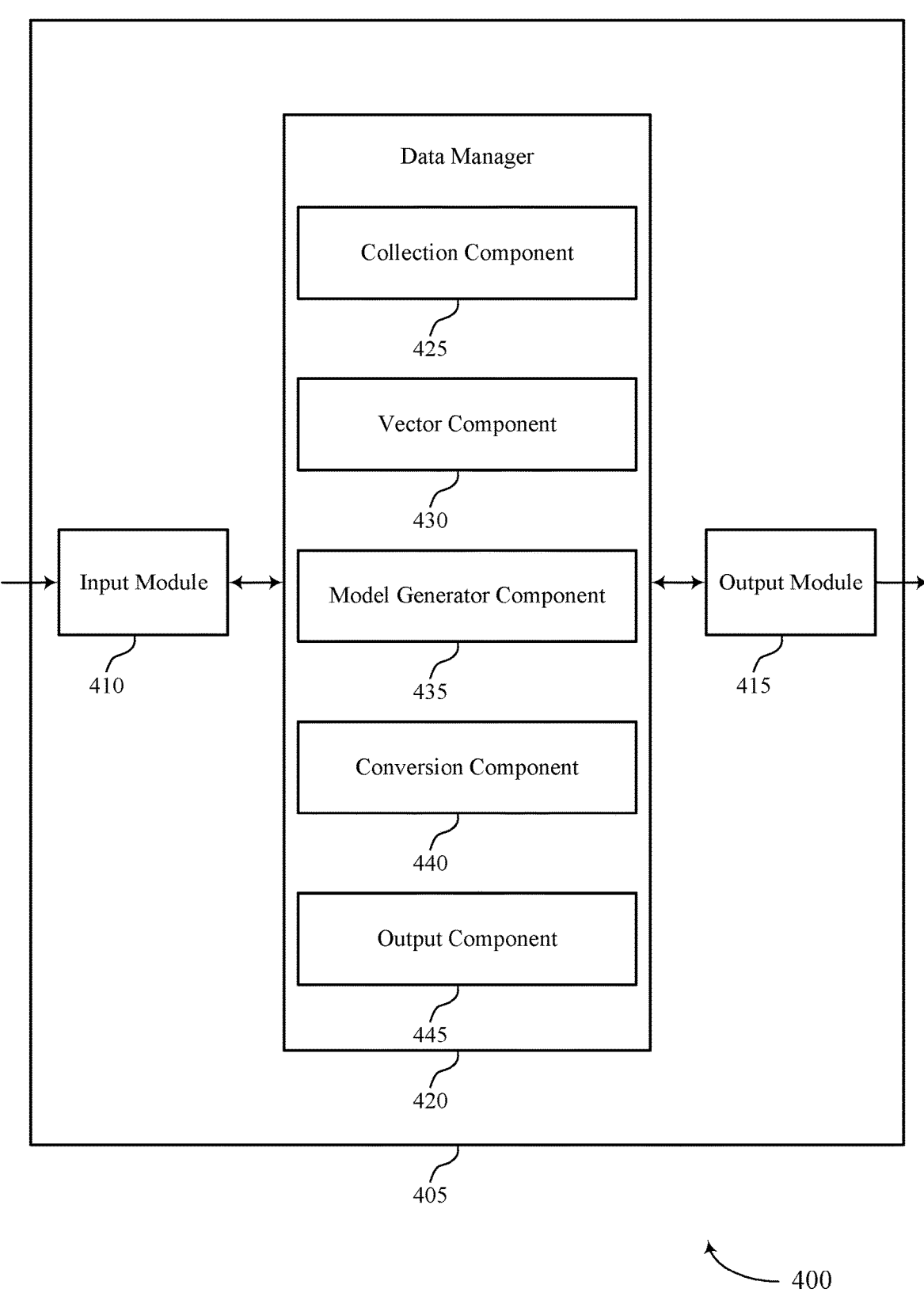
FIG. 4 illustrates a block diagram of an apparatus that supports identifying method footprints using vector embeddings in accordance with aspects of the present disclosure.

FIG. 4 illustrates a block diagram 400 of a device 405 that supports identifying method footprints using vector embeddings in accordance with aspects of the present disclosure. The device 405 may include an input module 410, an output module 415, and a data manager 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX, LINUX®, or another known operating system to handle input signals. The input module 410 may send aspects of these input signals to other components of the device 405 for processing. For example, the input module 410 may transmit input signals to the data manager 420 to support identifying method footprints using vector embeddings. In some cases, the input module 410 may be a component of an I/O controller 610 as described with reference to FIG. 6.

The output module 415 may manage output signals for the device 405. For example, the output module 415 may receive signals from other components of the device 405, such as the data manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the data manager 420 may include a collection component 425, a vector component 430, a model generator component 435, a conversion component 440, an output component 445, or any combination thereof. In some examples, the data manager 420, or various components thereof, may be configured to perform various operations (e.g., receiving, monitoring, transmitting) using or otherwise in cooperation with the input module 410, the output module 415, or both. For example, the data manager 420 may receive information from the input module 410, send information to the output module 415, or be integrated in combination with the input module 410, the output module 415, or both to receive information, transmit information, or perform various other operations as described herein.

The data manager 420 may support data processing in accordance with examples as disclosed herein. The collection component 425 may be configured to support collecting a first set of metrics associated with computational resource consumption of one or more code implementations. The vector component 430 may be configured to support converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation. The model generator component 435 may be configured to support generating a model representation of the computational resource consumption of the one or more code implementations based on the one or more first vector spaces. The conversion component 440 may be configured to support converting a second set of metrics associated with the computational resource consumption of the one or more code implementations into one or more second vector spaces corresponding to the one or more code implementations. The output component 445 may be configured to support outputting a result of a comparison between the one or more second vector spaces and the model representation.

Figure 5:
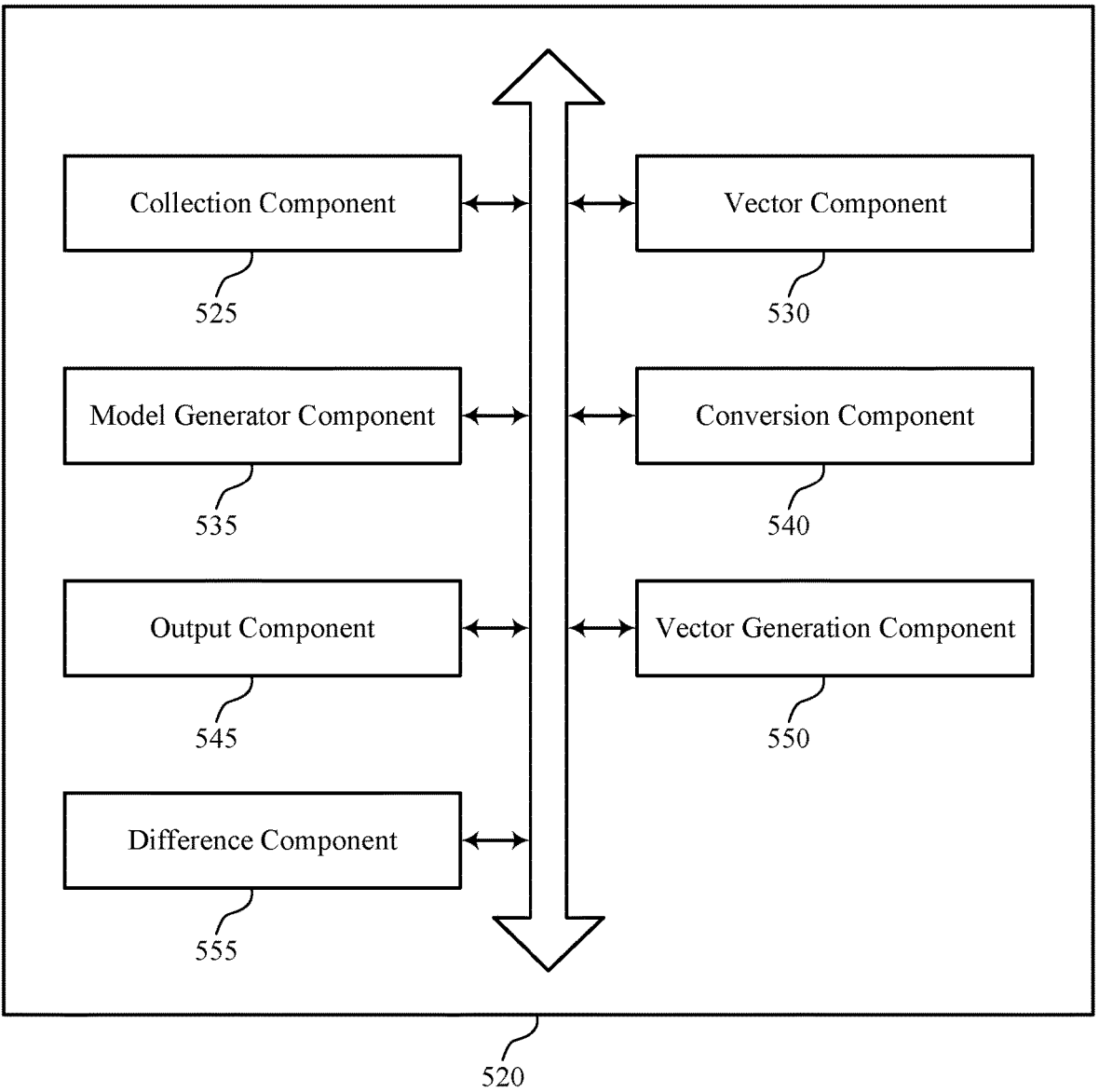
FIG. 5 illustrates a block diagram of a data manager that supports identifying method footprints using vector embeddings in accordance with aspects of the present disclosure.

FIG. 5 illustrates a block diagram 500 of a data manager 520 that supports identifying method footprints using vector embeddings in accordance with aspects of the present disclosure. The data manager 520 may be an example of aspects of a data manager or a data manager 420, or both, as described herein. The data manager 520, or various components thereof, may be an example of means for performing various aspects of identifying method footprints using vector embeddings as described herein. For example, the data manager 520 may include a collection component 525, a vector component 530, a model generator component 535, a conversion component 540, an output component 545, a vector generation component 550, a difference component 555, or any combination thereof. Each of these components may communicate, directly or indirectly, with one another (e.g., via one or more buses).

The data manager 520 may support data processing in accordance with examples as disclosed herein. The collection component 525 may be configured to support collecting a first set of metrics associated with computational resource consumption of one or more code implementations. The vector component 530 may be configured to support converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation. The model generator component 535 may be configured to support generating a model representation of the computational resource consumption of the one or more code implementations based on the one or more first vector spaces. The conversion component 540 may be configured to support converting a second set of metrics associated with the computational resource consumption of the one or more code implementations into one or more second vector spaces corresponding to the one or more code implementations. The output component 545 may be configured to support outputting a result of a comparison between the one or more second vector spaces and the model representation.

In some examples, to support converting the first set of metrics into the one or more first vector spaces, the vector generation component 550 may be configured to support generating the vector corresponding to the execution of the code implementation, where the vector includes a set of multiple values representing the computational resource consumption.

In some examples, the vector generation component 550 may be configured to support generating the set of multiple values representing the computational resource consumption based on the first set of metrics.

In some examples, to support converting the first set of metrics into the one or more first vector spaces, the vector generation component 550 may be configured to support generating a set of multiple vector identifiers for the set of multiple vectors, where a vector identifier for the vector corresponds to a set of multiple values representing the computational resource consumption.

In some examples, the difference component 555 may be configured to support identifying a difference between the model representation of the computational resource consumption and the second set of metrics based on the result of the comparison.

In some examples, the vector space includes an n-dimensional vector space that indicates a baseline computational resource consumption of the one or more code implementations. In some examples, the computational resource consumption includes central processing unit consumption, memory consumption, network consumption, or a combination thereof.

Figure 6:
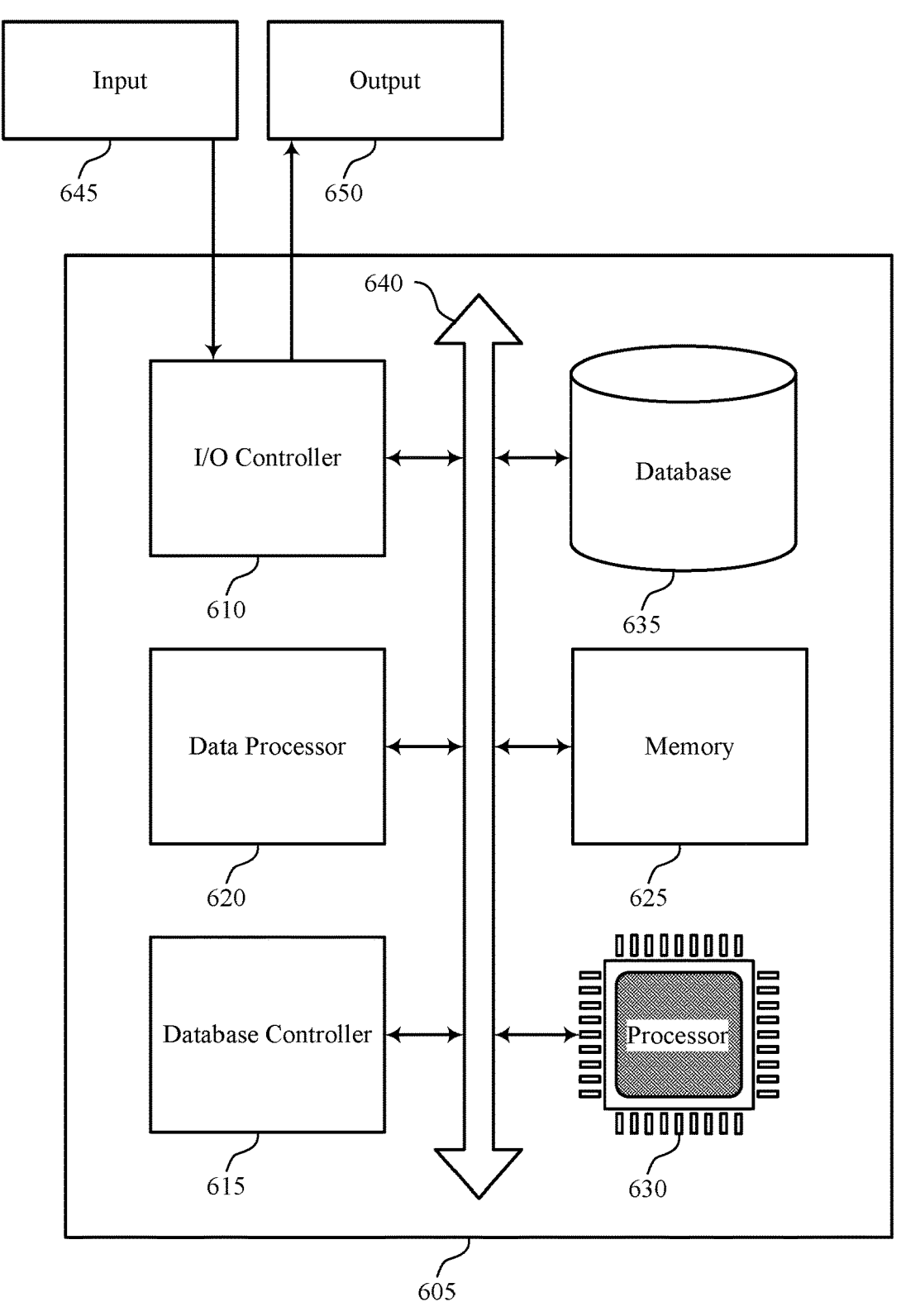
FIG. 6 illustrates a diagram of a system including a device that supports identifying method footprints using vector embeddings in accordance with aspects of the present disclosure.

FIG. 6 illustrates a diagram of a system 600 including a device 605 that supports identifying method footprints using vector embeddings in accordance with aspects of the present disclosure. The device 605 may be an example of or include the components of a device 405 as described herein. The device 605 may include components for bi-directional data communications including components for transmitting and receiving communications, such as a data manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device

605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting identifying method footprints using vector embeddings).

The data manager 620 may support data processing in accordance with examples as disclosed herein. For example, the data manager 620 may be configured to support collecting a first set of metrics associated with computational resource consumption of one or more code implementations. The data manager 620 may be configured to support converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation. The data manager 620 may be configured to support generating a model representation of the computational resource consumption of the one or more code implementations based on the one or more first vector spaces. The data manager 620 may be configured to support converting a second set of metrics associated with the computational resource consumption of the one or more code implementations into one or more second vector spaces corresponding to the one or more code implementations. The data manager 620 may be configured to support outputting a result of a comparison between the one or more second vector spaces and the model representation.

By including or configuring the data manager 620 in accordance with examples as described herein, the device 605 may support techniques for identifying method footprints using vector embeddings, which may improve user experience, improve resource consumption, increase efficiencies, and reduce performance issues.

FIG. 7 illustrates a flowchart showing a method 700 that supports identifying method footprints using vector embeddings in accordance with aspects of the present disclosure. The operations of the method 700 may be implemented by a data manager or its components as described herein. For example, the operations of the method 700 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 705, the method may include collecting a first set of metrics associated with computational resource consumption of one or more code implementations. The operations of 705 may be performed in accordance with examples as disclosed herein. In some examples, aspects of the operations of 705 may be performed by a collection component 525 as described with reference to FIG. 5.

At 710, the method may include converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation. The operations of 710 may be performed in accordance with examples as disclosed herein. In some examples, aspects of the operations of 710 may be performed by a vector component 530 as described with reference to FIG. 5.

At 715, the method may include generating a model representation of the computational resource consumption of the one or more code implementations based on the one or more first vector spaces. The operations of 715 may be performed in accordance with examples as disclosed herein. In some examples, aspects of the operations of 715 may be performed by a model generator component 535 as described with reference to FIG. 5.

At 720, the method may include converting a second set of metrics associated with the computational resource consumption of the one or more code implementations into one or more second vector spaces corresponding to the one or more code implementations. The operations of 720 may be performed in accordance with examples as disclosed herein. In some examples, aspects of the operations of 720 may be performed by a conversion component 540 as described with reference to FIG. 5.

At 725, the method may include outputting a result of a comparison between the one or more second vector spaces and the model representation. The operations of 725 may be performed in accordance with examples as disclosed herein. In some examples, aspects of the operations of 725 may be performed by an output component 545 as described with reference to FIG. 5.

Figure 8:
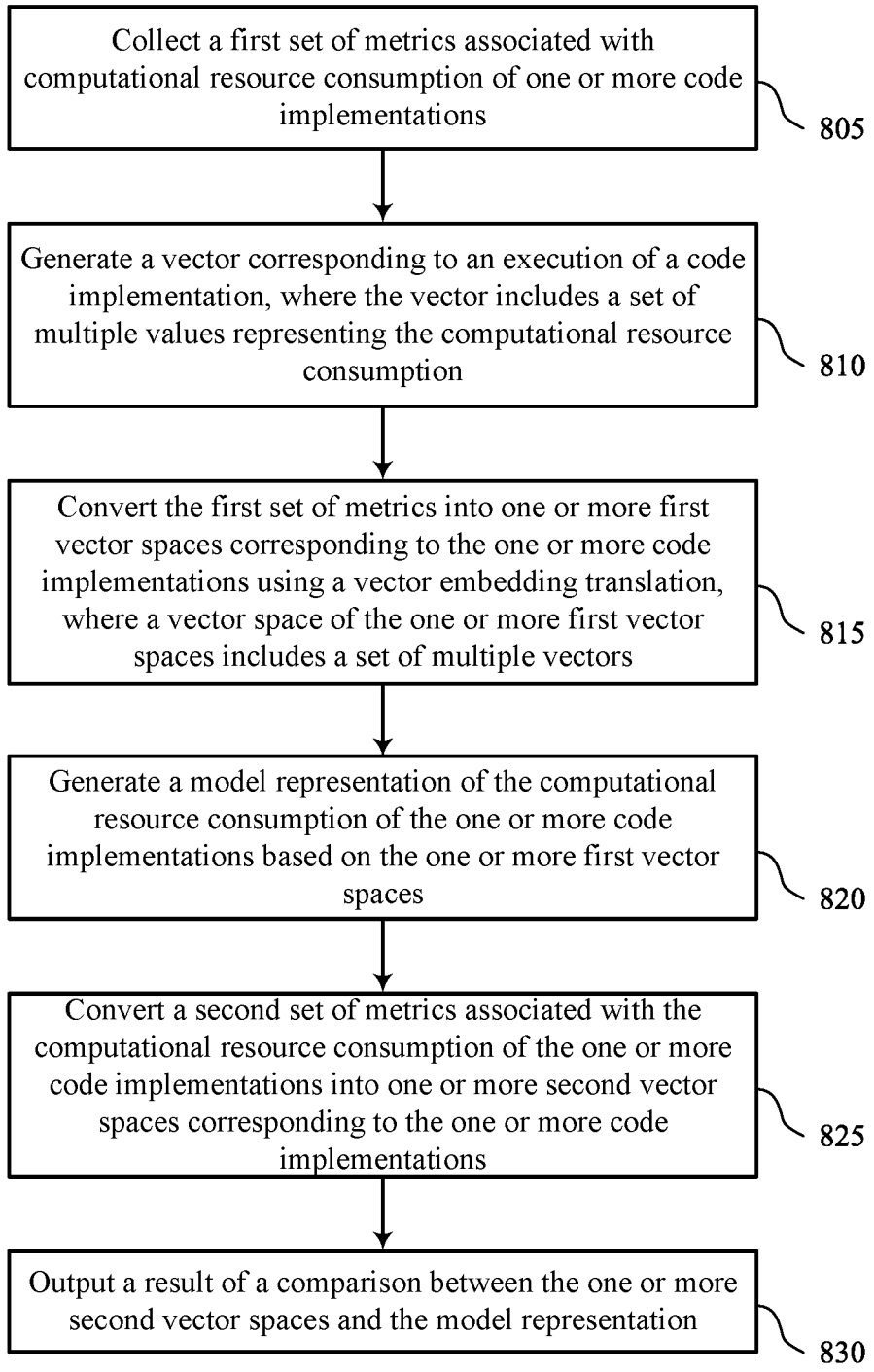

FIG. 8 illustrates a flowchart showing a method 800 that supports identifying method footprints using vector embeddings in accordance with aspects of the present disclosure. The operations of the method 800 may be implemented by a data manager or its components as described herein. For example, the operations of the method 800 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 805, the method may include collecting a first set of metrics associated with computational resource consumption of one or more code implementations. The operations of 805 may be performed in accordance with examples as disclosed herein. In some examples, aspects of the operations of 805 may be performed by a collection component 525 as described with reference to FIG. 5.

At 810, the method may include generating a vector corresponding to an execution of a code implementation, where the vector includes a set of multiple values representing the computational resource consumption. The operations of 810 may be performed in accordance with examples as disclosed herein. In some examples, aspects of the operations of 810 may be performed by a vector generation component 550 as described with reference to FIG. 5.

At 815, the method may include converting the first set of metrics into one or more first vector spaces corresponding to the one or more code implementations using a vector embedding translation, where a vector space of the one or more first vector spaces includes a set of multiple vectors. The operations of 815 may be performed in accordance with examples as disclosed herein. In some examples, aspects of the operations of 815 may be performed by a vector component 530 as described with reference to FIG. 5.

At 820, the method may include generating a model representation of the computational resource consumption of the one or more code implementations based on the one or more first vector spaces. The operations of 820 may be performed in accordance with examples as disclosed herein. In some examples, aspects of the operations of 820 may be performed by a model generator component 535 as described with reference to FIG. 5.

At 825, the method may include converting a second set of metrics associated with the computational resource consumption of the one or more code implementations into one or more second vector spaces corresponding to the one or more code implementations. The operations of 825 may be performed in accordance with examples as disclosed herein. In some examples, aspects of the operations of 825 may be performed by a conversion component 540 as described with reference to FIG. 5.

At 830, the method may include outputting a result of a comparison between the one or more second vector spaces and the model representation. The operations of 830 may be performed in accordance with examples as disclosed herein. In some examples, aspects of the operations of 830 may be performed by an output component 545 as described with reference to FIG. 5.

FIG. 9 illustrates a flowchart showing a method 900 that supports identifying method footprints using vector embeddings in accordance with aspects of the present disclosure. The operations of the method 900 may be implemented by a data manager or its components as described herein. For example, the operations of the method 900 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 905, the method may include collecting a first set of metrics associated with computational resource consumption of one or more code implementations. The operations of 905 may be performed in accordance with examples as disclosed herein. In some examples, aspects of the operations of 905 may be performed by a collection component 525 as described with reference to FIG. 5.

At 910, the method may include converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation. The operations of 910 may be performed in accordance with examples as disclosed herein. In some examples, aspects of the operations of 910 may be performed by a vector component 530 as described with reference to FIG. 5.

At 915, the method may include generating a model representation of the computational resource consumption of the one or more code implementations based on the one or more first vector spaces. The operations of 915 may be performed in accordance with examples as disclosed herein. In some examples, aspects of the operations of 915 may be performed by a model generator component 535 as described with reference to FIG. 5.

At 920, the method may include converting a second set of metrics associated with the computational resource consumption of the one or more code implementations into one or more second vector spaces corresponding to the one or more code implementations. The operations of 920 may be performed in accordance with examples as disclosed herein. In some examples, aspects of the operations of 920 may be performed by a conversion component 540 as described with reference to FIG. 5.

At 925, the method may include outputting a result of a comparison between the one or more second vector spaces and the model representation. The operations of 925 may be performed in accordance with examples as disclosed herein. In some examples, aspects of the operations of 925 may be performed by an output component 545 as described with reference to FIG. 5.

At 930, the method may include identifying a difference between the model representation of the computational resource consumption and the second set of metrics based on the result of the comparison. The operations of 930 may be performed in accordance with examples as disclosed herein. In some examples, aspects of the operations of 930 may be performed by a difference component 555 as described with reference to FIG. 5.

A method for data processing is described. The method may include collecting a first set of metrics associated with computational resource consumption of one or more code implementations, converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation, generating a model representation of the computational resource consumption of the one or more code implementations based on the one or more first vector spaces, converting a second set of metrics associated with the computational resource consumption of the one or more code implementations into one or more second vector spaces corresponding to the one or more code implementations, and outputting a result of a comparison between the one or more second vector spaces and the model representation.

An apparatus for data processing is described. The apparatus may include a processor, memory coupled with the processor, and instructions stored in the memory. The instructions may be executable by the processor to cause the apparatus to collect a first set of metrics associated with computational resource consumption of one or more code implementations, convert the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation, generate a model representation of the computational resource consumption of the one or more code implementations based on the one or more first vector spaces, convert a second set of metrics associated with the computational resource consumption of the one or more code implementations into one or more second vector spaces corresponding to the one or more code implementations, and output a result of a comparison between the one or more second vector spaces and the model representation.

Another apparatus for data processing is described. The apparatus may include means for collecting a first set of metrics associated with computational resource consumption of one or more code implementations, means for converting the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation, means for generating a model representation of the computational resource consumption of the one or more code implementations based on the one or more first vector spaces, means for converting a second set of metrics associated with the computational resource consumption of the one or more code implementations into one or more second vector spaces corresponding to the one or more code implementations, and means for outputting a result of a comparison between the one or more second vector spaces and the model representation.

A non-transitory computer-readable medium storing code for data processing is described. The code may include instructions executable by a processor to collect a first set of metrics associated with computational resource consumption of one or more code implementations, convert the first set of metrics into one or more first vector spaces corresponding to the one or more code implementations using a vector embedding translation, where a vector space of the one or more first vector spaces includes a set of multiple vectors, and where a vector of the set of multiple vectors corresponds to an execution of a code implementation, generate a model representation of the computational resource consumption of the one or more code implementations based on the one or more first vector spaces, convert a second set of metrics associated with the computational resource consumption of the one or more code implementations into one or more second vector spaces corresponding to the one or more code implementations, and output a result of a comparison between the one or more second vector spaces and the model representation.

In some examples of the method, apparatuses, and non-transitory computer-readable medium described herein, converting the first set of metrics into the one or more first vector spaces may include operations, features, means, or instructions for generating the vector corresponding to the execution of the code implementation, where the vector includes a set of multiple values representing the computational resource consumption.

Some examples of the method, apparatuses, and non-transitory computer-readable medium described herein may further include operations, features, means, or instructions for generating the set of multiple values representing the computational resource consumption based on the first set of metrics.

In some examples of the method, apparatuses, and non-transitory computer-readable medium described herein, converting the first set of metrics into the one or more first vector spaces may include operations, features, means, or instructions for generating a set of multiple vector identifiers for the set of multiple vectors, where a vector identifier for the vector corresponds to a set of multiple values representing the computational resource consumption.

Some examples of the method, apparatuses, and non-transitory computer-readable medium described herein may further include operations, features, means, or instructions for identifying a difference between the model representation of the computational resource consumption and the second set of metrics based on the result of the comparison.

In some examples of the method, apparatuses, and non-transitory computer-readable medium described herein, the vector space includes an n-dimensional vector space that indicates a baseline computational resource consumption of the one or more code implementations.

In some examples of the method, apparatuses, and non-transitory computer-readable medium described herein, the computational resource consumption includes central processing unit consumption, memory consumption, network consumption, or a combination thereof.

The following provides an overview of aspects of the present disclosure:

Aspect 1: A method for data processing, comprising: collecting a first set of metrics associated with computational resource consumption of one or more code implementations: converting the first set of metrics into one or more first vector spaces corresponding to the one or more code implementations using a vector embedding translation, wherein a vector space of the one or more first vector spaces comprises a plurality of vectors, and wherein a vector of the plurality of vectors corresponds to an execution of a code implementation: generating a model representation of the computational resource consumption of the one or more code implementations based at least in part on the one or more first vector spaces: converting a second set of metrics associated with the computational resource consumption of the one or more code implementations into one or more second vector spaces corresponding to the one or more code implementations: and outputting a result of a comparison between the one or more second vector spaces and the model representation.

Aspect 2: The method of aspect 1, wherein converting the first set of metrics into the one or more first vector spaces comprises: generating the vector corresponding to the execution of the code implementation, wherein the vector comprises a plurality of values representing the computational resource consumption.

Aspect 3: The method of aspect 2, further comprising: generating the plurality of values representing the computational resource consumption based at least in part on the first set of metrics.

Aspect 4: The method of any of aspects 1 through 3, wherein converting the first set of metrics into the one or more first vector spaces comprises: generating a plurality of vector identifiers for the plurality of vectors, wherein a vector identifier for the vector corresponds to a plurality of values representing the computational resource consumption.

Aspect 5: The method of any of aspects 1 through 4, further comprising: identifying a difference between the model representation of the computational resource consumption and the second set of metrics based at least in part on the result of the comparison.

Aspect 6: The method of any of aspects 1 through 5, wherein the vector space comprises an n-dimensional vector space that indicates a baseline computational resource consumption of the one or more code implementations.

Aspect 7: The method of any of aspects 1 through 6, wherein the computational resource consumption comprises central processing unit consumption, memory consumption, network consumption, or a combination thereof.

Aspect 8: An apparatus for data processing, comprising a processor: memory coupled with the processor: and instructions stored in the memory and executable by the processor to cause the apparatus to perform a method of any of aspects 1 through 7.

Aspect 9: An apparatus for data processing, comprising at least one means for performing a method of any of aspects 1 through 7.

Aspect 10: A non-transitory computer-readable medium storing code for data processing, the code comprising instructions executable by a processor to perform a method of any of aspects 1 through 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

collecting a first set of metrics associated with computational resource consumption of one or more code implementations;

converting the first set of metrics into one or more first vector spaces corresponding to the one or more code implementations using a vector embedding translation, wherein a vector space of the one or more first vector spaces comprises a plurality of vectors, and wherein a vector of the plurality of vectors corresponds to an execution of a code implementation;

generating, prior to an execution of the one or more code implementations, an embedded vector space model representation of the computational resource consumption of the one or more code implementations based at least in part on the one or more first vector spaces, the embedded vector space model representation being indicative of a baseline computational resource consumption;

executing the one or more code implementations, wherein during the execution of the one or more code implementations, the method further comprises:

collecting, during the execution of the one or more code implementations, a second set of metrics that is indicative of a real-time computational resource consumption of the one or more code implementations during the execution of the one or more code implementations;

converting the second set of metrics associated with the real-time computational resource consumption of the one or more code implementations into one or more second vector spaces corresponding to the one or more code implementations; and detecting a difference between the embedded vector space model representation of the computational resource consumption and the second set of metrics based at least in part on a comparison between the one or more second vector spaces and the embedded vector space model representation, the difference being indicative of a computational resource consumption difference between the baseline computational resource consumption and the real-time computational resource consumption; and outputting a result of the comparison between the one or more second vector spaces and the embedded vector space model representation, the result of the comparison indicating an inefficient code implementation of the one or more code implementations based at least in part on the detected difference, wherein the one or more code implementations are modified based at least in part on outputting the indication of the inefficient code implementation via the result of the comparison.

2. The method of claim 1, wherein converting the first set of metrics into the one or more first vector spaces comprises:

generating the vector corresponding to the execution of the code implementation, wherein the vector comprises a plurality of values representing the computational resource consumption.

3. The method of claim 2, further comprising:

generating the plurality of values representing the computational resource consumption based at least in part on the first set of metrics.

4. The method of claim 1, wherein converting the first set of metrics into the one or more first vector spaces comprises:

generating a plurality of vector identifiers for the plurality of vectors, wherein a vector identifier for the vector corresponds to a plurality of values representing the computational resource consumption.

5. The method of claim 1, wherein the vector space comprises an n-dimensional vector space that indicates the baseline computational resource consumption of the one or more code implementations.

6. The method of claim 1, wherein the computational resource consumption comprises central processing unit consumption, memory consumption, network consumption, or a combination thereof.

7. An apparatus for data processing, comprising:

at least one processor;

at least one memory coupled with the at least one processor; and instructions stored in the at least one memory and executable by the at least one processor to cause the apparatus to:

collect a first set of metrics associated with computational resource consumption of one or more code implementations;

convert the first set of metrics into one or more first vector spaces corresponding to the one or more code implementations using a vector embedding translation, wherein a vector space of the one or more first vector spaces comprises a plurality of vectors, and wherein a vector of the plurality of vectors corresponds to an execution of a code implementation;

generate, prior to an execution of the one or more code implementations, an embedded vector space model representation of the computational resource consumption of the one or more code implementations based at least in part on the one or more first vector spaces, the embedded vector space model representation being indicative of a baseline computational resource consumption;

execute the one or more code implementations, wherein during the execution of the one or more code implementations, the instructions are further executable by the at least one processor to cause the apparatus to:

collect, during the execution of the one or more code implementations, a second set of metrics that is indicative of a real-time computational resource consumption of the one or more code implementations during the execution of the one or more code implementations;

convert the second set of metrics associated with the real-time computational resource consumption of the one or more code implementations into one or more second vector spaces corresponding to the one or more code implementations; and detect a difference between the embedded vector space model representation of the computational resource consumption and the second set of metrics based at least in part on a comparison between the one or more second vector spaces and the embedded vector space model representation, the difference being indicative of a computational resource consumption difference between the baseline computational resource consumption and the real-time computational resource consumption; and output a result of the comparison between the one or more second vector spaces and the embedded vector space model representation, the result of the comparison indicating an inefficient code implementation of the one or more code implementations based at least in part on the detected difference, wherein the one or more code implementations are modified based at least in part on outputting the indication of the inefficient code implementation via the result of the comparison.

8. The apparatus of claim 7, wherein the instructions to convert the first set of metrics into the one or more first vector spaces are executable by the at least one processor to cause the apparatus to:

generate the vector corresponding to the execution of the code implementation, wherein the vector comprises a plurality of values representing the computational resource consumption.

9. The apparatus of claim 8, wherein the instructions are further executable by the at least one processor to cause the apparatus to:

generate the plurality of values representing the computational resource consumption based at least in part on the first set of metrics.

10. The apparatus of claim 7, wherein the instructions to convert the first set of metrics into the one or more first vector spaces are executable by the at least one processor to cause the apparatus to:

generate a plurality of vector identifiers for the plurality of vectors, wherein a vector identifier for the vector corresponds to a plurality of values representing the computational resource consumption.

11. The apparatus of claim 7, wherein the vector space comprises an n-dimensional vector space that indicates the baseline computational resource consumption of the one or more code implementations.

12. The apparatus of claim 7, wherein the computational resource consumption comprises central processing unit consumption, memory consumption, network consumption, or a combination thereof.

13. A non-transitory computer-readable medium storing code for data processing, the code comprising instructions executable by a at least one processor to:

collect a first set of metrics associated with computational resource consumption of one or more code implementations;

convert the first set of metrics into one or more first vector spaces corresponding to the one or more code implementations using a vector embedding translation, wherein a vector space of the one or more first vector spaces comprises a plurality of vectors, and wherein a vector of the plurality of vectors corresponds to an execution of a code implementation;

generate, prior to an execution of the one or more code implementations, an embedded vector space model representation of the computational resource consumption of the one or more code implementations based at least in part on the one or more first vector spaces, the embedded vector space model representation being indicative of a baseline computational resource consumption;

execute the one or more code implementations, wherein during the execution of the one or more code implementations, the instructions are further executable by the at least one processor to:

collect, during the execution of the one or more code implementations, a second set of metrics that is indicative of a real-time computational resource consumption of the one or more code implementations during the execution of the one or more code implementations;

convert the second set of metrics associated with the real-time computational resource consumption of the one or more code implementations into one or more second vector spaces corresponding to the one or more code implementations; and detect a difference between the embedded vector space model representation of the computational resource consumption and the second set of metrics based at least in part on a comparison between the one or more second vector spaces and the embedded vector space model representation, the difference being indicative of a computational resource consumption difference between the baseline computational resource consumption and the real-time computational resource consumption; and output a result of the comparison between the one or more second vector spaces and the embedded vector space model representation, the result of the comparison indicating an inefficient code implementation of the one or more code implementations based at least in part on the detected difference, wherein the one or more code implementations are modified based at least in part on outputting the indication of the inefficient code implementation via the result of the comparison.

14. The non-transitory computer-readable medium of claim 13, wherein the instructions to convert the first set of metrics into the one or more first vector spaces are executable by the at least one processor to:

generate the vector corresponding to the execution of the code implementation, wherein the vector comprises a plurality of values representing the computational resource consumption.

15. The non-transitory computer-readable medium of claim 14, wherein the instructions are further executable by the at least one processor to:

generate the plurality of values representing the computational resource consumption based at least in part on the first set of metrics.

16. The non-transitory computer-readable medium of claim 13, wherein the instructions to convert the first set of metrics into the one or more first vector spaces are executable by the at least one processor to:

generate a plurality of vector identifiers for the plurality of vectors, wherein a vector identifier for the vector corresponds to a plurality of values representing the computational resource consumption.

17. The non-transitory computer-readable medium of claim 13, wherein the vector space comprises an n-dimensional vector space that indicates the baseline computational resource consumption of the one or more code implementations.

* * * * *